(12) United States Patent  
Foth

(10) Patent No.: US 6,473,498 B1
(45) Date of Patent: Oct. 29, 2002

(54) METHOD AND SYSTEM FOR MAXIMIZING USE OF A COMMUNICATION LINE

(75) Inventor: Thomas J. Foth, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/469,031

(22) Filed: Dec. 21, 1999

(51) Int. Cl.[7] .............................................. H04M 11/00
(52) U.S. Cl. ................................ 379/93.09; 379/100.16
(58) Field of Search ........................... 379/93.09, 93.11, 379/93.35, 100.15, 100.16, 215.01, 208.1, 142.07, 142.08

(56) References Cited

U.S. PATENT DOCUMENTS

| | | | | |
|---|---|---|---|---|
| 5,666,364 A | * | 9/1997 | Pierce et al. | 379/208 |
| 5,787,155 A | * | 7/1998 | Luna | 379/93.09 |
| 5,812,656 A | * | 9/1998 | Garland et al. | 379/215 |
| 5,999,613 A | * | 12/1999 | Nabkel et al. | 379/215 |
| 6,160,877 A | * | 12/2000 | Tatchell et al. | 379/215 |

* cited by examiner

*Primary Examiner*—Stella Woo
(74) *Attorney, Agent, or Firm*—Kimberly S. Chotkowski; Angelo N. Chaclas

(57) ABSTRACT

According to the present invention, a single incoming/outgoing line, such as a telephone line, is enabled to transmit and receive information through a variety of information routing systems. The present invention employs a facsimile machine having a monitor/switching device that enables or disables a variety of communication devices based upon signal traffic detected by the monitor in combination with a set of predetermined user priority parameters. Predetermined user priority parameters may include factors such as the time of transmission, the user identity, a user priority override designation and/or the type of information being transferred.

21 Claims, 5 Drawing Sheets

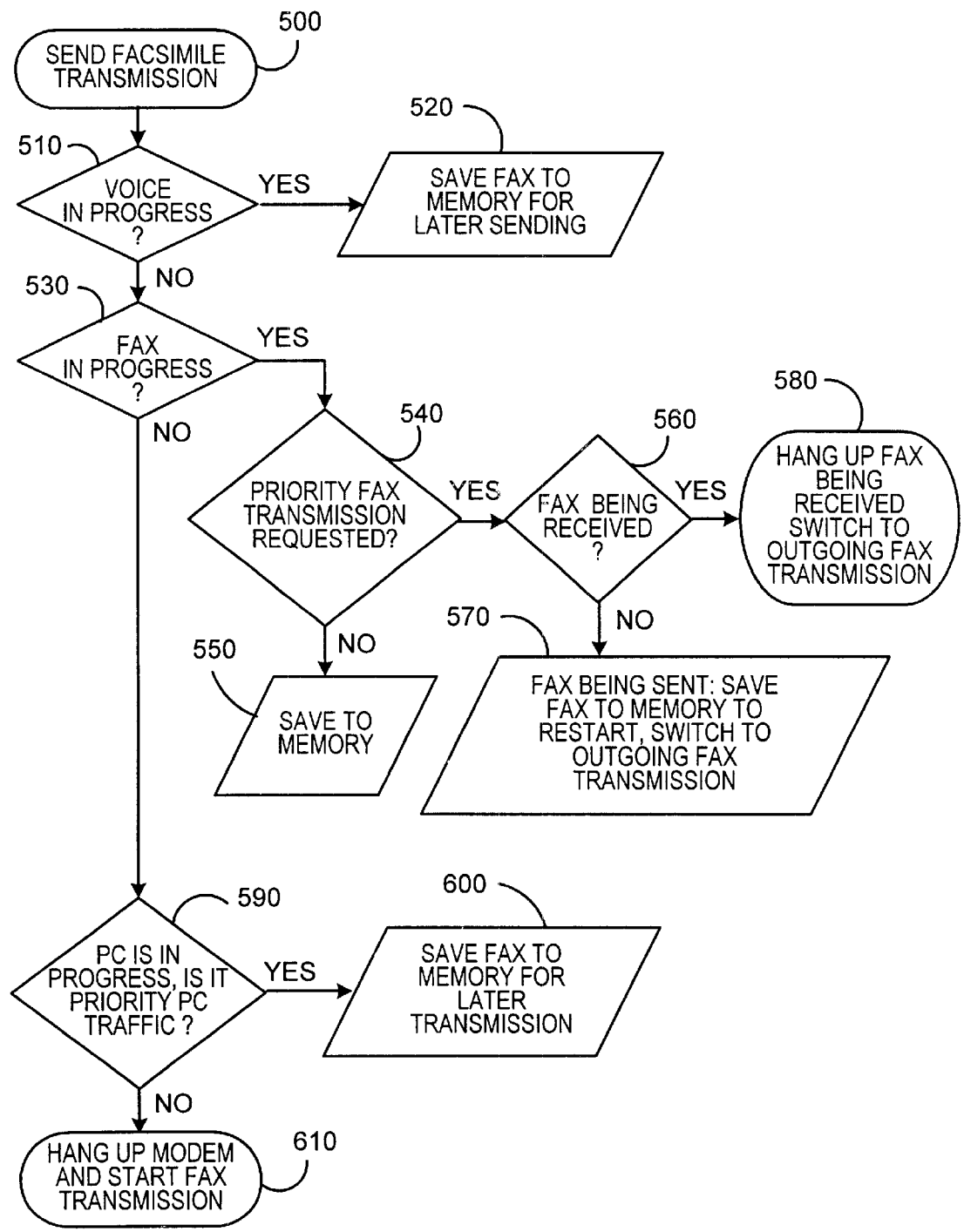

METHOD AND SYSTEM FOR MAXIMIZING USE OF A COMMUNICATION LINE

FIELD OF THE INVENTION

The present invention relates generally to the efficient use of telecommunication systems. Specifically, this invention allows multiple communications devices to share a single communication line based upon user specified priority parameters. More particularly, this device relates to a method and system for sharing a single telephone line within a facsimile machine, by monitoring use and switching between communication devices based upon predetermined user parameters.

BACKGROUND OF THE INVENTION

In recent years, the means for establishing electronic communications has increased, more and more people have employed telephone, facsimile, answering machines, e-mail, internet and intranet to communicate or propagate information. Traditionally, in order to facilitate communication using these different formats, the user has been required to purchase different kinds of appropriate devices. That is, the user must install a standard telephone, a facsimile machine, a personal computer and modem separately in order to take advantage of the communication systems. Moreover, in typical application, the user must install a separate communication line, such as a telephone line, in order to support these systems. For small business owners and individual users, who desire multiple telephone lines for one or more of these communications systems, the cost of securing such lines may be prohibitive. Furthermore, the recent increase in the demand for new telephone lines from the central office of the Public Switching Telephone Network (PSTN) has prompted some central offices to stop issuing any new phone lines for an indefinite period of time. Therefore, a need has risen in which the use of a single telephone line may be expanded to support the variety of available communication devices.

BRIEF SUMMARY OF THE INVENTION

The present invention enables a single communication line to transmit and receive information through a variety of information routing systems. Specifically, the present invention employs a facsimile machine having a monitor/switching device that directs information traffic based upon observed signal traffic and user predetermined priority parameters. User predetermined priority parameters may include factors such as time of transmission, user identity, type of information being transferred and/or a user priority override designation.

The present invention is described with reference to a facsimile machine however, the present invention may be applied to any device having an incoming/outgoing line. The facsimile machine is operatively connected to one or more personal computers, one or more optional phone devices, and a telephone line. The personal computer may be connected to the facsimile machine by an RS232 cable or, if multiple personal computers exists, through a network and local area network device. The facsimile device further includes a facsimile component for performing typical facsimile transmissions operatively connected to a switching device with a monitor, and a memory device and a data traffic monitor tap, and a caller identification decoder. The memory device stores incoming or outgoing facsimiles when directed by the switch device. The monitor, which is connected to the switching device, directs the switch device to performing two functions simultaneously. First, the switch device momentarily asserts an on hook and off hook signal, for purposes of signaling a call waiting function provided by a central office. Second, the switch establishes the proper connection and is positioned between the incoming/outgoing line, and either the facsimile component; the optional phone device(s); or, personal computer(s). The switch is operatively connected to the incoming/outgoing line and also to the optional phone device(s) through an RJ11 jack. The incoming/outgoing line in turn is connected to the public switch telephone network (PSTN) also through an RJ11 jack. Both the public switch telephone network and RJ11 jack are known in the art of the communications, therefore a detailed description is not necessary for the understanding of the present invention.

The monitor observes signal traffic being sent from the optional phone device(s), personal computer(s) and/or the facsimile component, as well as, signal traffic incoming to the facsimile machine through the incoming/outgoing line. The monitor also observes data traffic flowing through the modem via a data traffic monitor tap. The caller identification decoder provides the monitor the identity of the incoming telephone call.

Based upon a set of user predetermined priority parameters, in conjunction with the system activity and identity as observed by the monitor, the precedence of the signals is determined and the switch is directed to either enable or disable certain communication devices. For example, if the monitor determines that the communication signal is incoming from a high level priority designation, this takes precedence and the monitor activates the switch to accept the communication, and terminates either the personal computer user, the facsimile transmission or other active device. Examples of communication signals incoming to the facsimile machine at the incoming/outgoing line are voice calls, either for an answering machine or real time; facsimile transmissions; or Point to Point Protocol (PPP), Serial Line Interface Protocol (SLIP) or Microsoft Remote Access Server (RAS). Outgoing communication signals include voice; facsimile to facsimile over the incoming/outgoing line; facsimile to facsimile over the incoming/outgoing line via internet; facsimile memory, stored in memory unit to a facsimile over the incoming/outgoing line; facsimile memory to facsimile via internet; personal computer to internet; personal computer to intranet; and personal computer to any computer having PPP, SLIP or RAS.

Another example of user priority preference is, if an outgoing signal is identified to have originated from a high priority user, the communication signal will not be interrupted for any type of signal traffic. If, however, the communication signal is an outgoing facsimile and the monitor detects that a high priority user is trying to send an incoming facsimile, the switch will prompt the outgoing facsimile to be sent to the memory and prompt the incoming facsimile to be received.

Other objects, features and advantages of the invention will become apparent from the following description of specific embodiments when read in conjunction with the accompanying drawings.

BRIEF DESCRIPTION OF THE DRAWING

FIG. 6 is a flow chart describing the method of communicating a facsimile document within the present invention;

DETAILED DESCRIPTION OF THE PREFERRED EMBODIMENT

Figure 1:
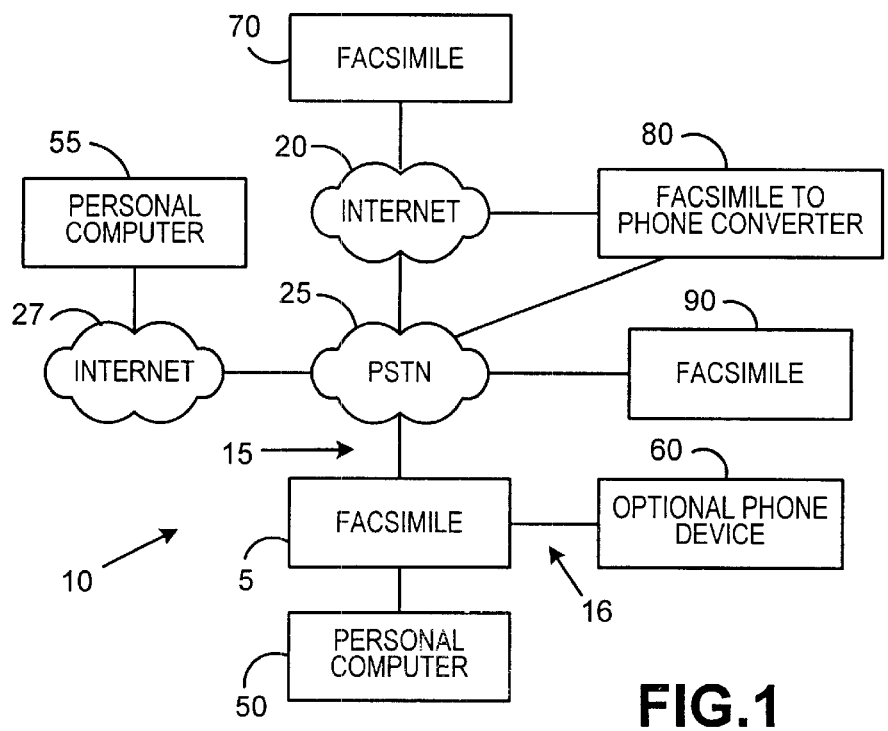
FIG. 1 is a high-level block diagram of the overall system of the present invention in a personal computer environment.
Figure 2:
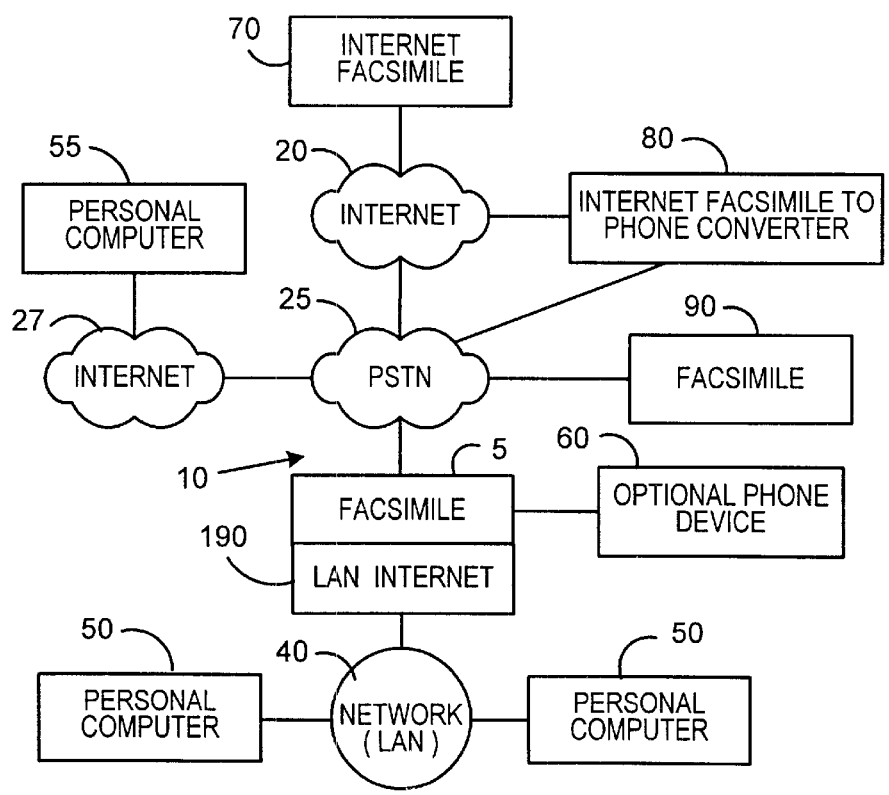
FIG. 2 is a high-level block diagram of the overall system of the present invention in a network environment.

Referring now in detail to the drawings, and more particularly to FIG. 1, is a high-level block diagram of system 10 in which the present invention may be implemented. System 10 is shown in a personal computer (PC) environment and includes a facsimile machine 5 operatively connected to PC 50 and an optional phone device 60 via incoming/outgoing line 10. A plurality of personal computers 50 and/or a plurality of optional phone devices may be operatively connected to facsimile machine 5. Optional phone device 60 may be for example, a telephone or a facsimile machine, answering machine or any machine being operatively connected via a communication line such as a telephone line. Facsimile machine 5 is further connected via incoming/outgoing line 15 to the Public Switch Telephone Network (PSTN). The Internet 20 connects to facsimile machine 5 through the PSTN 25. Internet 20 may be further connected to one or more facsimile machines 70 or facsimile to phone converters 80, which is then connected to facsimile 90 through PSTN 25. Facsimile 5 may also connect directly to facsimile 90 through the PSTN 26. Personal computer 50 may connect with PC55 by way of facsimile, PSTN 25 and Intranet 27 using protocols such as SLIP, PPP, RAS or other computer-to-computer protocols. FIG. 2 illustrates a similar system as described in FIG. 1 in a network environment having one or more personal computers 50 connected via a local area network interface 190 through local area network 40 to facsimile 5.

Figure 3:
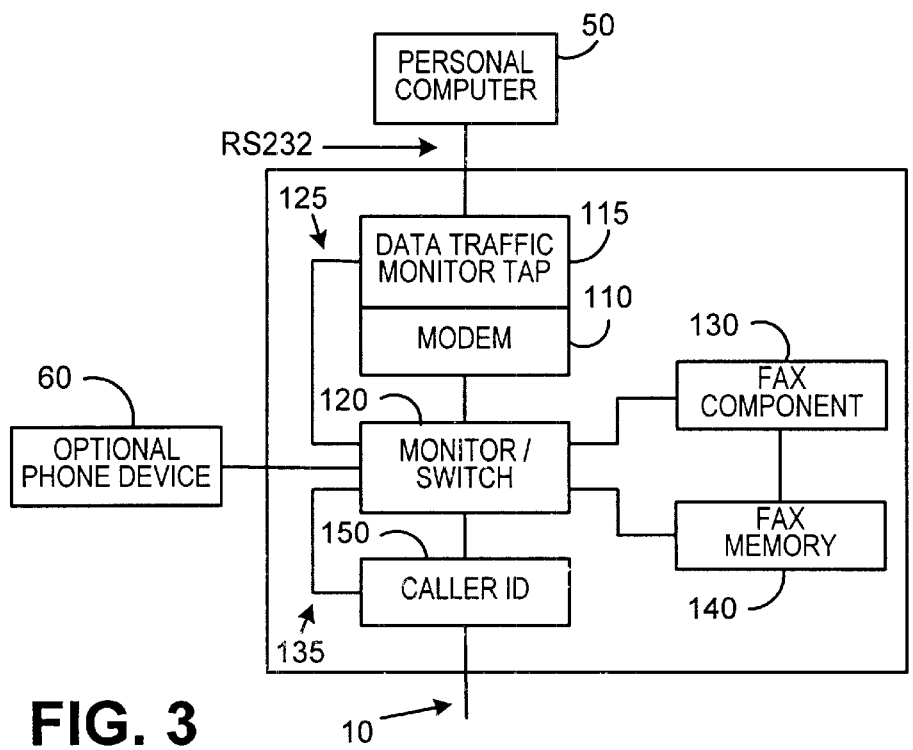
FIG. 3 is a detailed block diagram of the system of the present invention in a personal computer environment.

Now turning to FIG. 3 is illustrated the detailed telephone and data connections in the PC environment between personal computers 50, optional phone device 60, and facsimile machine 5. Facsimile machine 5 further includes a facsimile component 130 for performing typical facsimile transmissions. Facsimile component 130 is operatively connected to memory unit 140 for storing incoming facsimiles or outgoing facsimiles when directed. Facsimile component 130 and monitor/switch 120 are interconnected. Monitor/switch device 120 performs two functions simultaneously. First, monitor/switch 120 momentarily asserts an on hook and off hook, for purposes of signaling a call waiting function provided by a central office; and establishes the proper connection between incoming/outgoing line 10 and either, facsimile machine 130, optional phone device 60, or modem 110. The switching function is controlled by a signal provided by the internal by monitoring signals from data traffic monitor tap 115, caller id 150, and then detects telephone signal traffic being sent and received from optional phone device 60, modem 110 and/or facsimile component 130, data traffic monitor tap 115, as well as signal traffic on incoming/outgoing line 10. Personal computer 50 may be connected to facsimile machine 5 through an RS232 cable. Switch 120 may be connected to optional phone device 60 through an RJ11 jack. Incoming/outgoing line 10 is connected to the Public Switched Telephone Network (PSTN) also through an RJ11 jack. Both the PSTN and RJ11jack are known in the art of communications therefore, a detailed description of the PSTN and an RJ11 is not necessary for the understanding of the present invention.

Caller identification 150 is operatively positioned on line 10 and connected to monitor/switch 120. Called identification 150 enables monitor/switch 120 to identify an incoming signal and thereafter monitor/switch 120 determines what action to take based upon a user predetermined set of parameters. For example, if the monitor determines that the signal is created by a priority user, the monitor activates monitor/switch device 120 to accept the signal and terminate either the personal computer use or the active facsimile transmission or optional phone device. Examples of signal incoming to facsimile machine 5 at incoming/outgoing line 10 are: voice, either for an answering machine or real time; facsimile transmissions; or, Point to Point Protocol (PPP), Serial Line Interface Protocol (SLIP) or Microsoft Remote Access Server (RAS). Outgoing signals may include, among other signals: facsimile 130 to facsimile 90 transmission over incoming/outgoing line 10; facsimile 130 to facsimile 70 via modem 110 over incoming/outgoing line 10 via internet 20; facsimile memory, stored in memory unit 140 to facsimile 90 via modem over incoming/outgoing line 10; facsimile memory to facsimile 70 via internet 20; personal computer 50 to internet 20; personal computer 50 to personal computer 55 via modem 110 the PSTN and Intranet 27; personal computer to any computer having PPP, SLIP or RAS. Another possible outgoing call is a voice call from optional phone device 60.

Figure 4:
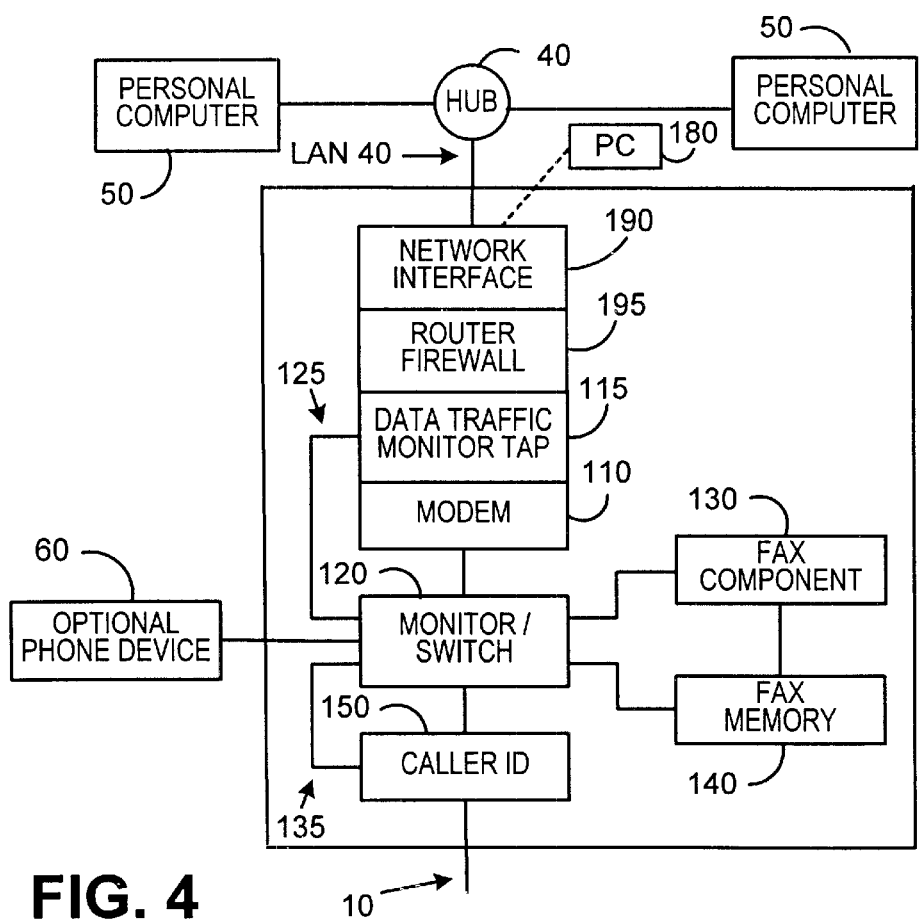
FIG. 4 is a detailed block diagram of the system of the present invention in a network environment.

Now turning to FIG. 4 is a similar facsimile machine 5 as described with reference to FIG. 3, however FIG. 4 is shown in a network environment. In order to utilize a network connection, facsimile 5 includes a local area network (LAN) interface 190 operatively connected to network 40 and monitor/switch 120, for supporting multiple personal computers. The LAN interface can be any LAN interface or those interface surrogating as a LAN interface such as Universal Serial Bus (USB), Inferred Data Access (IRDa) and parallel port connections. Facsimile machine 5, as modified for network application, also includes proxy-router firewall 195 operatively connected to monitor/switch 120 and modem 110. Personal computer 50 may be connected to local area network interface 190, contained within facsimile machine 5 through network hub 40 or directly to local area network interface 190 through cross cable 180. LAN interfaces are known, therefore a detailed description of the interface is not necessary for an understanding of the present invention.

Figure 5:
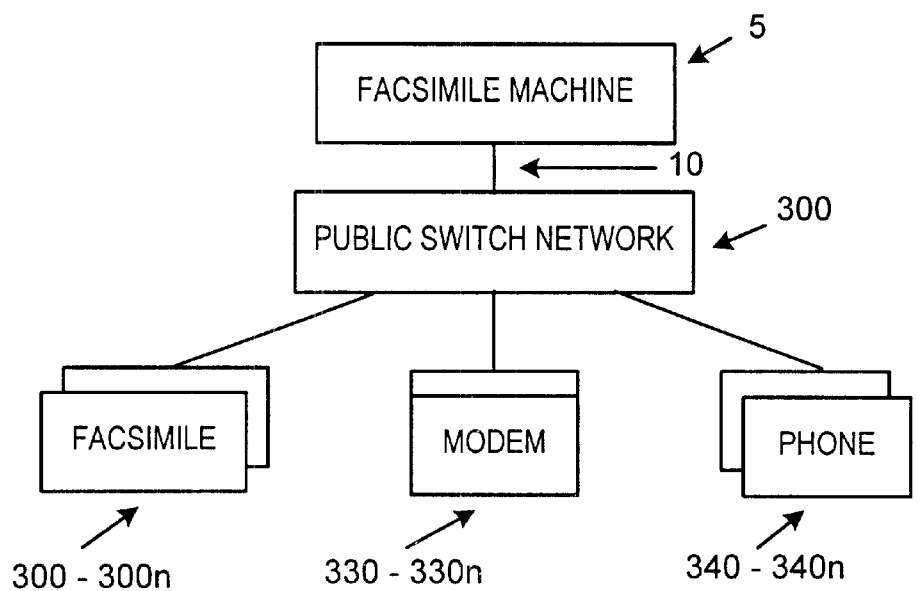
FIG. 5 is a diagram depicting the possible communication destination of the incoming/outgoing line of the present invention.

FIG. 5 depicts possible outputs that may be connected at incoming/outgoing line 10. Line 10 is connected to PSTN 300, which may then be connected to one or more of a variety of devices, such as, standard telephone(s) 34–340n, facsimile machine(s) 320–320n, or modem(s) 330–330n. In turn, the devices specifically, the modems may communicate with a network or any device that interfaces with a modem.

Now Turning to FIG. 6, which is a flow chart depicting the method of the present invention from the perspective that the user is prompting facsimile component 130 to transmit a document. It should be noted that the order of the methods set forth in FIG. 6 and FIG. 7 may vary, depending upon user and system preferences. The method of FIG. 6 begins at step 500 where the user prompts facsimile component 130 to send a document transmission. The method continues to step 510 where monitor/switch 120 queries as to whether or not there is a voice call in progress. If the answer to the query is "yes," then the method proceeds to step 520 where the document transmission is stored in memory 140 for later transmission. If the response to the query at step 510 is "no," the method proceeds to step 530 where the monitor queries as to whether or not there is a facsimile transmission in progress. If the response to the query is "yes," then the method proceeds to step 540 where monitor/switch 120 queries if there has been a request for a priority transmission. A priority transmission may be determined, by factors such as: who is sending the facsimile; when is the facsimile being sent; what is being sent or, merely a designation by the user that the facsimile is a priority. If, at step 540, a priority transmission is not requested, then the method proceeds to step 550 where the facsimile transmission is saved to memory 130 for transmission at a later time. If, however, a priority transmission is requested, then the method continues at step 560 and queries as to whether or not a facsimile is being received. If the response to step 560 is "no," then it is determined that a facsimile is already being sent and the remainder of the facsimile being sent is saved to memory 140 for transmission at a later time, while monitor/switch 120 enables the outgoing facsimile to be transmitted. At this time, a page may be sent to notify recipient of interruption. If, however, the answer to the query at step 560 is "yes," then the method proceeds to step 580 where the facsimile being received is disconnected and monitor/switch 120 enables the outgoing facsimile to be sent.

If, however, at step 530 monitor/switch 120 determines that a facsimile is not being transmitted, then the method continues to step 590 where monitor/switch 120 queries as to whether or not the personal computer is attempting to communicate priority traffic. Priority personal computer traffic is determined by monitor/switch 120 and data traffic monitor tap 115 based upon factors such as; the identity of the user; the function being performing, time of use; and/or, frequency of operation, such as whether the traffic has been idle for a specified period of time. If the personal computer traffic is not a priority, then the method continues at step 610 where monitor/switch 120 disable the PC and enables the facsimile transmission.

Figure 7:
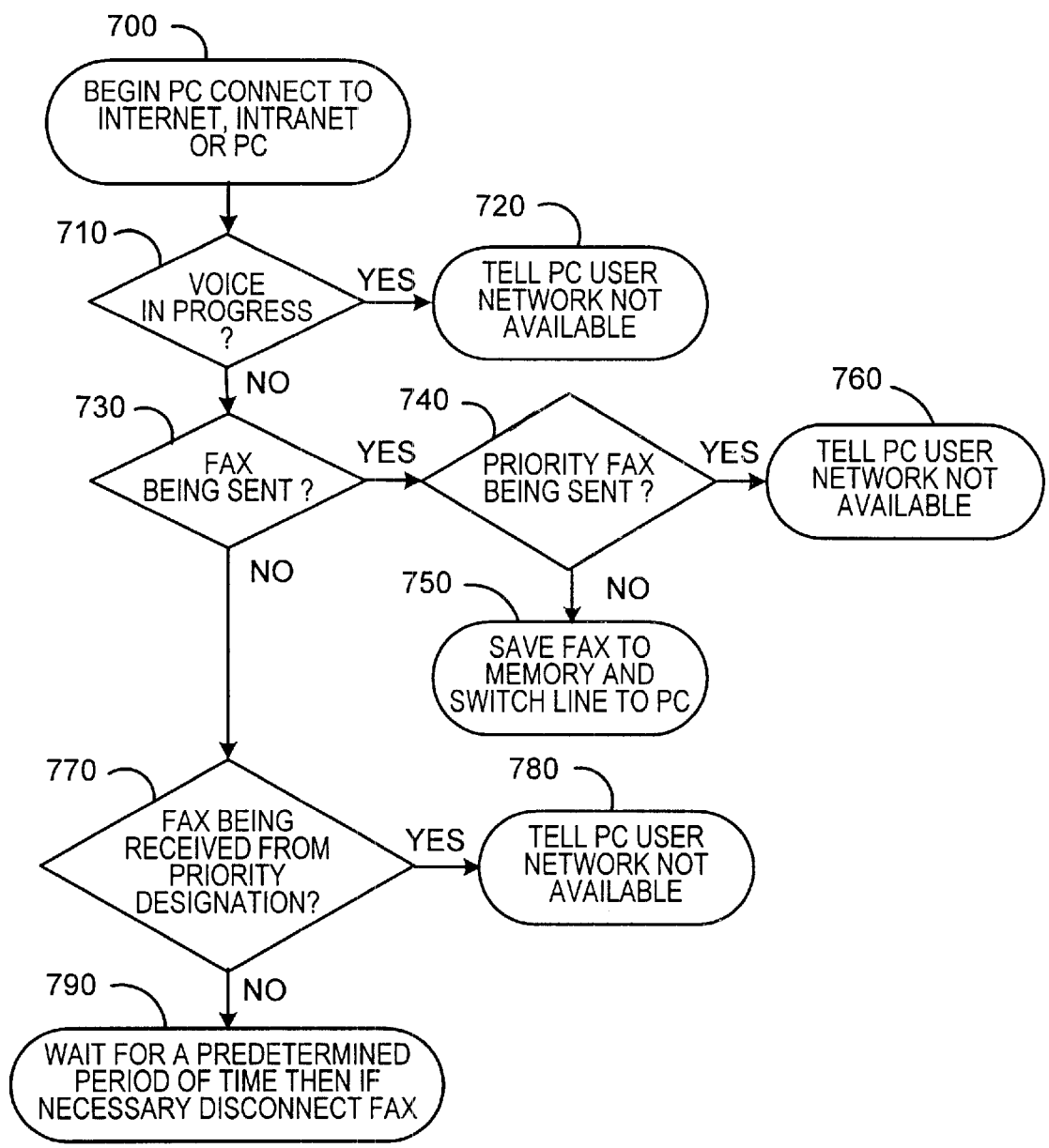
FIG. 7 is a second flow chart describing the method of establishing a personal computer interface within the present invention.

Now turning to FIG. 7 is a flow chart describing the method beginning at step 700 of the present invention from the perspective that the user is prompting a connection between personal computer 50 and either the internet 20 or intranet 27.

The method continues to step 710 where monitor/switch 120 queries as to whether or not there is a voice connection in progress. If there is a voice connection in progress, then the method progressed to step 720 where the personal computer user is prompted that the Internet/Intranet is not available. If a voice connection is not in progress, the method continues to step 730 where monitor/switch 120 determines whether or not a facsimile transmission is occurring. If the answer to the query at step 730 is "yes," then the method proceeds to step 740 where monitor/switch 120 determines whether or not the facsimile transmission is a priority transmission. If the facsimile transmission is a priority transmission, the method proceeds to step 760, where the personal computer user is prompted that the internet/intranet is not available for use. If, however, at step 740, monitor/switch 120 determines that the facsimile transmission is not a priority transmission, then the method proceeds to step 750, where the remainder of the facsimile transmission is sent to memory 140 and monitor/switch 120 enables a connection between personal computer 50 and internet 20 or intranet 27. As with FIG. 6, a page can be sent to the distant facsimile receiving the transmission, indicating the transmission is interrupted prior to switching the connection.

If, however, at step 730, monitor/switch 120 determined that an outgoing facsimile transmission is not in progress, then the method continued to step 770 where monitor/switch 120 further queries as to whether or not a priority facsimile is being received. If monitor/switch 120 determines that the facsimile being received is a priority transmission, then the method continues to step 780 where the personal computer user is prompted that the personnel computer can not be connected to internet 20 or intranet 27. If, however, the facsimile being received is not a priority transmission, then the method progresses to step 790 and waits for a predetermined period of time for the facsimile transmission to terminate (to allow the reception to possibly complete). Then monitor/switch 120 enables personal computer 50 to establish a connection to Internet 20 or Intranet 27. The predetermined period of time may be any time period designated by the user.

Figure 8:
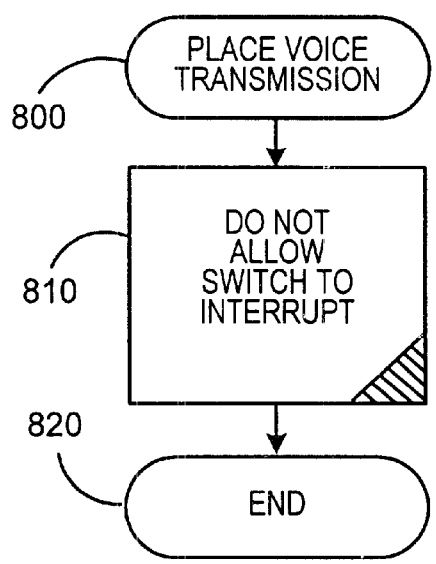
FIG. 8 is a final flow chart describing the method of establishing a voice communication within the present invention.

Now turning to FIG. 8 the method is described wherein if a voice call is being sent at step 800 anytime prior to attempting to transmit a facsimile or connecting the personal computer to either the internet 20 or intranet 27. The method then progresses to step 810 where the voice call continues uninterrupted. The method ends at step 820.

The above specification describes a new and improved system and method for automatically transferring information in a data processing system. It is realized that the above description may indicate to those skilled in the art additional ways in which the principles of this invention may be used without departing from the spirit. It is, therefore, intended that this invention be limited only by the scope of the appended claims.

What is claimed is:

1. A method for utilizing a communication line comprising:
   monitoring a single transmission line to determine whether there is an outgoing transmission;
   determining a type of outgoing transmission via the single line;
   determining a device associated with the outgoing transmission via the single line;
   assigning a first classification to the outgoing transmission based on the type of outgoing transmission and the device associated with the outgoing transmission;
   monitoring the single transmission line to determine whether there is an incoming transmission signal;
   assigning a second classification to the incoming transmission based on the type of incoming transmission and an intended destination of the incoming transmission;
   comparing the first classification and the second classification as a function of a pre-defined criteria;
   terminating the outgoing transmission and permitting the incoming transmission when the second classification takes precedence over the first classification; and
   prohibiting the incoming transmission when the first classification takes precedence over the second classification.

2. The method as claimed in claim 1, further comprising the step of transmitting a report to a user if the incoming transmission is enabled.

3. The method as claimed in claim 1, wherein the incoming transmission is a facsimile signal.

4. The method as claimed in claim 1, wherein the incoming transmission is a voice signal.

5. The method as claimed in claim 1, wherein the incoming transmission is derived from a personal computer.

6. The method as claimed in claim 1, wherein the outgoing transmission is a facsimile signal.

7. The method as claimed in claim 1, wherein the outgoing transmission is a voice signal.

8. The method as claimed in claim 1, wherein the outgoing transmission is a signal derived by a personal computer.

9. A method for utilizing a communication line comprising:

- monitoring a single communication line from an information routing device to determine whether there is an outgoing transmission;
- assigning a first priority signal to the outgoing transmission from the information routing device based on a predetermined criteria;
- wherein the predetermined criteria includes use data and content data;
- detecting whether an incoming transmission is being transmitted to the information routing device, via the single communication line;
- assigning a second priority signal to the incoming transmission based on the predetermined criteria;
- comparing the first priority signal to the second priority signal;
- determining signal precedence based upon said comparison;
- terminating the outgoing transmission and permitting the incoming transmission when the incoming transmission has a higher priority than the outgoing transmission; and
- continuing the outgoing transmission when the outgoing transmission has a higher priority than the incoming transmission.

10. An apparatus for utilizing a communication line comprising:

- means for monitoring a single communication line from an information routing device to determine whether there is an outgoing transmission;
- means for assigning a first priority signal to the outgoing transmission from the information routing device based on a predetermined criteria,
- wherein the predetermined criteria includes use data and content data;
- means for detecting whether an incoming transmission is being transmitted to the information routing device, via the single communication line;
- means for assigning a second priority signal to the incoming transmission based on the predetermined criteria;
- means for comparing the first priority signal to the second priority signal;
- means for determining signal precedence based upon said comparison;
- means for permitting the incoming transmission when the incoming transmission has a higher priority than the outgoing transmission; and
- means for continuing the outgoing transmission when the outgoing transmission has a higher priority than the incoming transmission.

11. An apparatus for utilizing a communication line comprising:

- a routing device adapted to determine priority of transmissions via a single line, wherein the device is adapted to:
- monitor a single transmission line to determine whether there is an outgoing transmission;
- determine a type of outgoing transmission via the single line;
- determine a device associated with the outgoing transmission via the single line;
- assign a first classification to the outgoing transmission based on the type of outgoing transmission and the device associated with the outgoing transmission;
- monitor the single transmission line to determine whether there is an incoming transmission signal;
- assign a second classification to the incoming transmission signal based on the type of incoming transmission and intended destination of the incoming transmission;
- compare the first classification and the second classification as a function of a pre-defined criteria;
- terminate the outgoing transmission and receive the incoming transmission when the second classification takes precedence over the first classification; and
- prohibit the incoming transmission when the first classification takes precedence over the second classification.

12. The apparatus as claimed in claim 11, wherein the routing device is adapted to transmit a report to a user if the incoming transmission is enabled.

13. The apparatus as claimed in claim 11, wherein the incoming transmission is a facsimile signal.

14. The apparatus as claimed in claim 11, wherein the incoming transmission is a voice signal.

15. The apparatus as claimed in claim 11, wherein the incoming transmission is derived from a personal computer.

16. The apparatus as claimed in claim 11, wherein the outgoing transmission is a facsimile signal.

17. The apparatus as claimed in claim 11, wherein the outgoing transmission is a voice signal.

18. The apparatus as claimed in claim 11, wherein the outgoing transmission is a signal derived by a personal computer.

19. A method adapted to be stored on a computer-readable medium comprising:

- monitoring a single communication line from an information routing device to determine whether there is an outgoing transmission;
- assigning a first priority signal to the outgoing transmission from the information routing device based on a pre-determined criteria;
- wherein the predetermined criteria includes use data and content data;
- detecting whether an incoming transmission is being transmitted to the information routing device, via the single communication line;
- assigning a second priority signal to the incoming transmission based on the predetermined criteria;
- comparing the first priority signal to the second priority signal;
- determining signal precedence based upon said comparison;
- permitting the incoming transmission when the incoming transmission has a higher priority than the outgoing transmission; and
- continuing the outgoing transmission when the outgoing transmission has a higher priority than the incoming transmission.

20. A method for utilizing a communication line comprising:

monitoring a single transmission line to determine whether there is a first outgoing transmission;

determining a type of the first outgoing transmission via the single line;

determining a device associated with the first outgoing transmission via the single line;

assigning a first classification to the first outgoing transmission based on the type of transmission and the device associated with the first outgoing transmission;

monitoring the single transmission line to determine whether there is a second outgoing transmission signal;

assigning a second classification to the second outgoing transmission based on the type of transmission and a device associated with the second outgoing transmission;

comparing the first classification and the second classification as a function of a pre-defined criteria;

terminating the first outgoing transmission and permitting the second outgoing transmission when the second classification takes precedence over the first classification; and prohibiting the second outgoing transmission when the first classification takes precedence over the second classification.

21. An apparatus for utilizing a communication line comprising:

a routing device adapted to determine priority of transmissions via a single line, wherein the device is adapted to:

monitor a single transmission line to determine whether there is a first outgoing transmission;

determine a type of first outgoing transmission via the single line;

determine a device associated with the first outgoing transmission via the single line;

assign a first classification to the first outgoing transmission based on the type of outgoing transmission and the device associated with the first outgoing transmission;

monitor the single transmission line to determine whether there is a second outgoing transmission signal;

assign a second classification to the second outgoing transmission signal based on the type of transmission and a device associated with the second outgoing transmission;

compare the first classification and the second classification as a function of a pre-defined criteria;

terminate the first outgoing transmission and permit the second outgoing transmission when the second classification takes precedence over the first classification; and prohibit the second outgoing transmission when the first classification takes precedence over the second classification.

* * * * *